(12) United States Patent
Corwin et al.

(10) Patent No.: US 8,973,957 B2
(45) Date of Patent: Mar. 10, 2015

(54) BUMPER ENERGY ABSORBER WITH SENSOR AND CONFIGURED LOBES

(71) Applicant: Shape Corp., Grand Haven, MI (US)

(72) Inventors: Cort Corwin, Grand Haven, MI (US);
Joseph Matecki, Allendale, MI (US);
Craig Oomen, Grand Rapids, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 14/245,017

(22) Filed: Apr. 4, 2014

(65) Prior Publication Data

US 2014/0312636 A1     Oct. 23, 2014

Related U.S. Application Data

(60) Provisional application No. 61/814,517, filed on Apr. 22, 2013.

(51) Int. Cl.
*B60R 19/18* (2006.01)
*B60R 21/34* (2011.01)
*B60R 19/34* (2006.01)

(52) U.S. Cl.
CPC .............. *B60R 19/34* (2013.01); *B60R 21/34* (2013.01); *B60R 19/18* (2013.01); *B60R 2021/343* (2013.01); *B60R 2019/1866* (2013.01)
USPC ..................... 293/102; 293/120; 296/187.04

(58) Field of Classification Search
CPC ...... B60R 19/483; B60R 19/44; B60R 19/04; B60R 19/18; B60R 2019/1886; B60R 2019/1853; B60R 2019/1833; B60R 2021/0025; B60R 2021/0037; B60R 2021/0051; B60R 2021/0053; B60R 2021/01006
USPC .............. 293/102, 120, 121, 132, 133; 296/187.04, 187.03, 187.09
See application file for complete search history.

(56) References Cited

U.S. PATENT DOCUMENTS

| | | | |
|---|---|---|---|
| 3,933,387 A | 1/1976 | Salloum et al. |
| 3,938,841 A | 2/1976 | Glance et al. |
| 4,275,912 A | 6/1981 | Bayer |
| 4,925,224 A | 5/1990 | Smiszek |
| 4,941,701 A | 7/1990 | Loren |
| 5,139,297 A | 8/1992 | Carpenter et al. |
| 5,290,078 A | 3/1994 | Bayer et al. |
| 5,290,079 A | 3/1994 | Syamal |
| 5,425,561 A | 6/1995 | Morgan |

(Continued)

FOREIGN PATENT DOCUMENTS

| | | |
|---|---|---|
| WO | 2004018261 | 3/2004 |
| WO | 2006127242 | 11/2006 |

*Primary Examiner* — Gregory Blankenship
(74) *Attorney, Agent, or Firm* — Price Heneveld LLP (57) ABSTRACT

A vehicle bumper system comprises a bumper reinforcement beam and an energy absorber with top and bottom rows of similarly-shaped spaced-apart crush lobes in alternating relation for uniform impact resistance across the bumper system. The illustrated top row of crush lobes provides a high first force-deflection curve for high impact forces, and the bottom row of crush lobes provides a lower second force-deflection curve, for pedestrian reduced injury. An elongated sensor is positioned under shear walls of the top and bottom crush lobes, and is retained by tabs on the energy absorber. This positively retains the sensor in position on the bumper system, with few (or zero) separate fasteners, while facilitating quick assembly and reliable operation of the sensor tube.

14 Claims, 5 Drawing Sheets

(56) References Cited

U.S. PATENT DOCUMENTS

| | | | |
|---|---|---|---|
| 5,988,713 A | 11/1999 | Okamura et al. | |
| 6,068,320 A | 5/2000 | Miyano | |
| 6,082,792 A | 7/2000 | Evans et al. | |
| 6,247,745 B1 | 6/2001 | Carroll, III et al. | |
| 6,315,339 B1 | 11/2001 | Devilliers et al. | |
| 6,398,275 B1 | 6/2002 | Hartel et al. | |
| 6,406,081 B1 | 6/2002 | Mahfet et al. | |
| 6,443,513 B1 | 9/2002 | Glance | |
| 6,467,821 B2 | 10/2002 | Hirota | |
| 6,575,510 B2 | 6/2003 | Weissenborn | |
| 6,609,740 B2 | 8/2003 | Evans | |
| 6,644,701 B2 | 11/2003 | Weissenborn et al. | |
| 6,663,150 B1 | 12/2003 | Evans | |
| 6,669,251 B2 | 12/2003 | Trappe | |
| 6,669,252 B2 | 12/2003 | Roussel et al. | |
| 6,672,635 B2 | 1/2004 | Weissenborn et al. | |
| 6,685,243 B1 | 2/2004 | Evans | |
| 6,715,592 B2 | 4/2004 | Suzuki et al. | |
| 6,726,262 B2 | 4/2004 | Marijnissen et al. | |
| 6,746,061 B1 | 6/2004 | Evans | |
| 6,758,506 B2 | 7/2004 | Malteste et al. | |
| 6,848,730 B2 | 2/2005 | Evans | |
| 6,866,313 B2 | 3/2005 | Mooijman | |
| 6,874,832 B2 | 4/2005 | Evans et al. | |
| 6,877,785 B2 | 4/2005 | Evans et al. | |
| 6,890,009 B2 * | 5/2005 | Murata et al. | 293/109 |
| 6,908,127 B2 | 6/2005 | Evans | |
| 6,923,494 B2 | 8/2005 | Shuler et al. | |
| 6,938,936 B2 | 9/2005 | Mooijman et al. | |
| 6,949,209 B2 | 9/2005 | Zander et al. | |
| 6,962,379 B2 | 11/2005 | Minami et al. | |
| 6,994,384 B2 | 2/2006 | Shuler et al. | |
| 6,997,490 B2 | 2/2006 | Evans et al. | |
| 7,031,674 B2 | 4/2006 | Kataoka et al. | |
| 7,044,515 B2 | 5/2006 | Mooijman et al. | |
| 7,052,056 B2 | 5/2006 | Weissenborn et al. | |
| 7,073,831 B2 * | 7/2006 | Evans | 293/155 |
| 7,086,690 B2 | 8/2006 | Shuler et al. | |
| 7,134,700 B2 | 11/2006 | Evans | |
| 7,144,054 B2 | 12/2006 | Evans | |
| 7,144,055 B2 | 12/2006 | Kimura et al. | |
| 7,147,258 B2 | 12/2006 | Evans et al. | |
| 7,159,911 B2 | 1/2007 | Nguyen et al. | |
| 7,163,242 B2 | 1/2007 | Shuler et al. | |
| 7,163,243 B2 * | 1/2007 | Evans | 293/121 |
| 7,172,227 B2 | 2/2007 | Weissenborn et al. | |
| 7,188,876 B2 * | 3/2007 | Jaarda et al. | 293/133 |
| 7,204,545 B2 | 4/2007 | Roux et al. | |
| 7,220,374 B2 | 5/2007 | Zander et al. | |
| 7,222,896 B2 | 5/2007 | Evans | |
| 7,222,897 B2 | 5/2007 | Evans et al. | |
| 7,234,741 B1 | 6/2007 | Reynolds et al. | |
| 7,278,667 B2 | 10/2007 | Mohapatra et al. | |
| 7,296,833 B2 | 11/2007 | Mohapatra et al. | |
| 7,399,014 B2 | 7/2008 | Mellis et al. | |
| 7,494,165 B2 * | 2/2009 | Evans et al. | 293/102 |
| 7,575,259 B2 * | 8/2009 | Hasegawa | 293/120 |
| 7,699,367 B2 | 4/2010 | Evans et al. | |
| 7,699,383 B2 * | 4/2010 | Fukukawa et al. | 296/187.04 |
| 7,733,219 B2 * | 6/2010 | Kamei et al. | 340/436 |
| 7,768,381 B2 * | 8/2010 | Takafuji et al. | 340/436 |
| 7,854,453 B2 * | 12/2010 | Tanabe | 293/102 |
| 7,881,843 B2 * | 2/2011 | Murakami et al. | 701/45 |
| 8,128,140 B2 * | 3/2012 | Tanabe | 293/117 |
| 8,196,979 B2 | 6/2012 | Ralston et al. | |
| 8,368,523 B2 * | 2/2013 | Takahashi et al. | 340/436 |
| 2002/0060462 A1 | 5/2002 | Glance | |
| 2002/0070584 A1 | 6/2002 | Carroll, III et al. | |
| 2003/0227183 A1 | 12/2003 | Weissenborn et al. | |
| 2004/0036302 A1 | 2/2004 | Shuler et al. | |
| 2004/0066048 A1 | 4/2004 | Mooijman et al. | |
| 2004/0084910 A1 * | 5/2004 | Amano et al. | 293/102 |
| 2004/0094977 A1 * | 5/2004 | Shuler et al. | 293/133 |
| 2004/0174025 A1 | 9/2004 | Converse et al. | |
| 2004/0201255 A1 | 10/2004 | Jonsson | |
| 2004/0256867 A1 * | 12/2004 | Evans et al. | 293/102 |
| 2005/0269837 A1 | 12/2005 | Carroll, III et al. | |
| 2006/0001277 A1 | 1/2006 | Mellis et al. | |
| 2006/0018089 A1 | 1/2006 | Chou | |
| 2006/0043743 A1 * | 3/2006 | Shuler et al. | 293/120 |
| 2006/0055187 A1 * | 3/2006 | Jaarda et al. | 293/133 |
| 2006/0145491 A1 * | 7/2006 | Shuler et al. | 293/120 |
| 2006/0261611 A1 | 11/2006 | Mohapatra et al. | |
| 2007/0069535 A1 | 3/2007 | Mohapatra et al. | |
| 2007/0108778 A1 * | 5/2007 | Evans et al. | 293/120 |
| 2007/0210615 A1 | 9/2007 | Tamada | |
| 2009/0206618 A1 | 8/2009 | Ralston et al. | |
| 2009/0322107 A1 * | 12/2009 | Takahashi et al. | 293/121 |
| 2010/0109354 A1 | 5/2010 | Agrahari et al. | |
| 2011/0109105 A1 * | 5/2011 | Ralston et al. | 293/132 |
| 2012/0061978 A9 * | 3/2012 | Ralston et al. | 293/132 |
| 2013/0313841 A1 * | 11/2013 | Mana et al. | 293/136 |

* cited by examiner

BUMPER ENERGY ABSORBER WITH SENSOR AND CONFIGURED LOBES

CROSS-REFERENCE TO RELATED APPLICATION

This application claims priority to Provisional Patent Application Ser. No. 61/814,517, filed on Apr. 22, 2013, entitled BUMPER ENERGY ABSORBER WITH SENSOR AND OFFSET LOBES, the entire disclosure of which is hereby incorporated by reference in its entirety.

BACKGROUND OF THE INVENTION

The present invention relates to bumpers having thermoplastic energy absorbers with crush lobes that crush to absorb a uniform and predictable amount of energy regardless of where impacted across a face of the bumper, and that are adapted with sensors to sense an impact. More particularly, the present invention relates to energy absorbers particularly designed for reduced injury upon impacting a pedestrian, and including an elongated impact sensor on the energy absorber.

Existing bumper systems include reinforcement beams and energy absorbers with crush lobes tuned to provide a desired impact resistance and energy absorption (i.e. a desired force-deflection curve). However, improvements are desired in the areas of improved pedestrian safety (e.g. reduced leg injury during an impact, regardless of impact location), and having the ability to reliably sense accidents and to optimally respond to varied impact severities (and for example, to pass barrier impact testing and also pedestrian leg injury minimization testing using a FLEX PLI test apparatus). Also, a design is desired having design flexibility, yet that provides consistency of crush lobe geometry and shape, and that is more easily moldable and tunable to a specific energy absorption force-deflection impact-receiving occurrence. Also, a design is desired having an integrated impact sensor carried in a position causing reliable and quick sensing of impacts.

SUMMARY OF THE INVENTION

In one aspect of the present invention, a bumper system comprises a bumper reinforcement beam having a face surface; and an energy absorber having a base flange engaging the face surface, and having forwardly-extending top and bottom rows of spaced-apart crush lobes, the top row of crush lobes providing a higher first force-deflection curve upon impact that is designed for barrier bumper impact testing, and the bottom row of crush lobes providing a lower second force-deflection curve upon impact designed for FLEX PLI pedestrian-leg-injury-simulating impact testing.

In another aspect of the present invention, a bumper system comprises a bumper reinforcement having a face surface, an energy absorber having a base flange engaging the face surface, and having forwardly-extending top and bottom rows of crush lobes, each crush lobe having shear walls, and an elongated sensor positioned at least partially between several of the crush lobes.

In another aspect of the present invention, an energy absorber apparatus is provided for a bumper system having a bumper reinforcement beam. The apparatus includes an energy absorber with a base flange adapted to engage the reinforcement beam and having forwardly-extending top and bottom rows of crush lobes, each crush lobe having shear walls. An elongated sensor is positioned at least partially under or immediately adjacent some of the shear walls of the energy absorber.

In another aspect of the present invention, a bumper system comprises a bumper reinforcement beam having a face surface; an energy absorber having a base flange engaging the face surface, and having at least one forwardly-extending row of similarly-shaped spaced-apart crush lobes; and a horizontally-extending tubular sensor secured to the energy absorber to retain the sensor in position on the bumper system. In a narrower form, the energy absorber includes integrally-formed structure, such as attachment tabs, that secure the tubular sensor to the energy absorber.

In another aspect of the present invention, a bumper system comprises a bumper reinforcement beam having a face surface, and an energy absorber having a base flange engaging the face surface and having at least one forwardly-extending rows of similarly-shaped spaced-apart crush lobes, each crush lobe having a plurality of shear walls that form a geometric shape with a face wall that closes a forward end of each crush lobe. The shear walls all include stiff wall structure of a first wall thickness and at least some shear walls also including a soft wall structure formed by thinned material thickness that is thinner than the first wall thickness and that causes a lower force of resistance during an initial impact stroke.

In a narrower form, the bumper system also includes a sensor tube attached to the energy absorber in a position where energy from a low impact occurrence is absorbed by the soft wall structure, and where energy from a high impact occurrence causes the stiff wall structure to engage the sensor tube in a manner generating and sending a signal representing a high impact occurrence.

In another aspect of the present invention, a bumper system comprises a bumper reinforcement beam having a face surface; an energy absorber having a base flange engaging the face surface, and having forwardly-extending top and bottom rows of similarly-shaped spaced-apart crush lobes; and an apron extending horizontally and spaced below the beam; the beam and top row of crush lobes combining to define a high first force-deflection curve that upon impact by a barrier bumper impact tester provides energy absorption to pass barrier bumper impact testing; the bottom row of crush lobes and apron combining to define a lower second force-deflection curve that upon impact against a FLEX PLI pedestrian-leg-injury-simulating impact testing device provides a lower second force-deflection curve upon that provides reduced leg injury sufficient to pass FLEX PLI leg-injury-simulating impact testing.

In one aspect of the present invention, a bumper system comprises a bumper reinforcement beam having a face surface, and an energy absorber having a base flange engaging the face surface and further having forwardly-extending top and bottom rows of similarly-shaped spaced-apart crush lobes. Each crush lobe has a centerline offset from the centerlines of vertically adjacent crush lobes, and each crush lobe has a vertical dimension DV and a horizontal dimension DH, with a ratio of DV:DH being less than 1.0.

An object of the present invention is to provide a bumper system with energy absorber that provides consistent local loading laterally across a vehicle during pedestrian impact (i.e. "on-lobe" and "between-lobe" impact resistance force is the same), yet that does so in a manner that is easily tuned, and that has low sensitivity to core shifting of a molding die.

An object of the present invention is to provide an alternate load level for IIHS bumper barrier offset overlap impacts, where one row of crush lobes (such as a bottom horizontal row) can be designed for pedestrian impact testing (to reduce leg injury) and another row of crush lobes (such as a top horizontal row) can be designed for different/higher loads for bumper barrier loading/impact testing.

An object of the present invention is to provide a bumper and energy absorber system where the energy absorber is configured to secure an elongated impact sensor (such as a silicone sensor tube) against a bumper reinforcement beam for consistent sensing of a vehicle impact and also using reduced parts while also facilitating assembly.

An object of the present invention is to provide an energy absorber with a soft initial force of resistance during an initial impact stroke, and with a higher force of resistance during a continued impact stroke, while reducing an effect of wall thickness variation, and also providing improved molding and allowing more efficient tuning of the final energy absorber, including use of very thin wall sections.

These and other aspects, objects, and features of the present invention will be understood and appreciated by those skilled in the art upon studying the following specification, claims, and appended drawings.

DETAILED DESCRIPTION

The illustrated apparatus (FIGS. 1-2) includes a bumper system 21 for a vehicle 20 comprising a bumper reinforcement beam 22 with mounts 23 attached to the vehicle frame rail tips 24, and an innovative energy absorber 25 on the beam's front (face) surface. The energy absorber 25 has a base flange 30 engaging the face surface, and forwardly-extending top and bottom rows of similarly-shaped spaced-apart crush lobes 31 and 32, respectively, each crush lobe having fore-aft-extending top, bottom, and side shear walls 33-36 and a front (face) wall 37. The illustrated crush lobes 31 and 32 each define a centerline CL offset from the centerlines of vertically adjacent crush lobes, but it is contemplated that the crush lobes can be vertically aligned or non-uniformly offset if desired.

Figure 1:
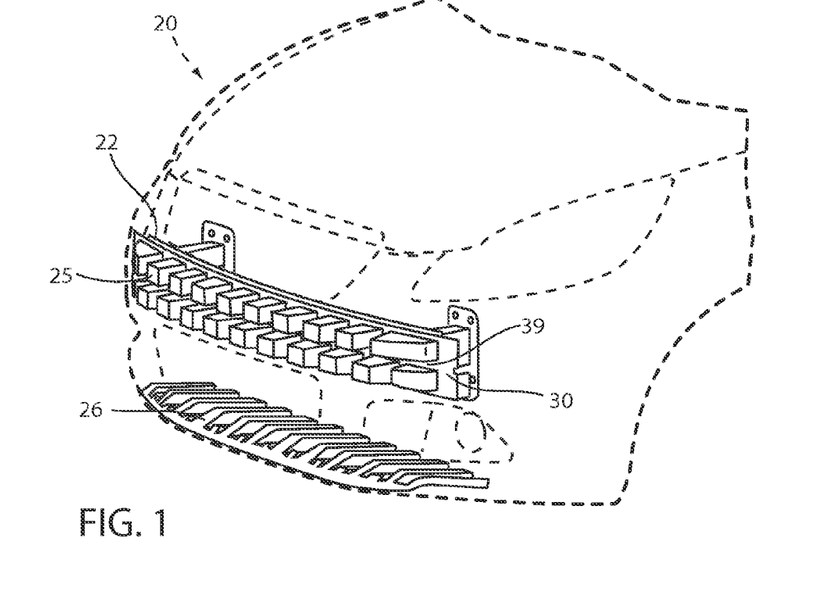
FIG. 1 is a perspective view of a vehicle front end including a bumper system, the bumper system including a bumper reinforcement beam, a polymeric energy absorber with two horizontal rows of crush lobes in alternating pattern, and a lower apron at ankle level to a pedestrian.
Figure 2:
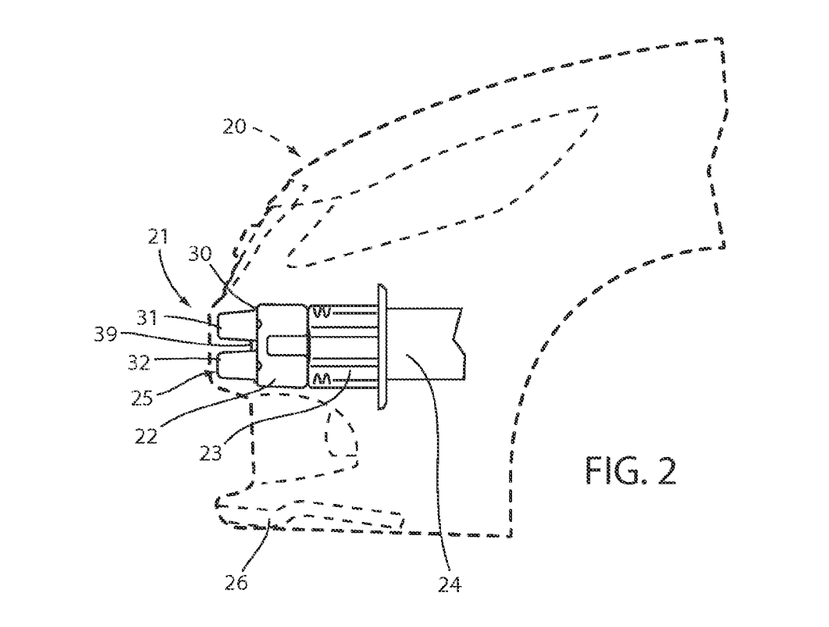
FIG. 2 is a side view of FIG. 1.

The upper row of the illustrated crush lobes 31 are designed to provide a uniform impact against a rigid post (and against an IIHS post impact test device) regardless of a particular location of impact, and the lower row of crush lobes 32 are designed to provide a uniform impact against a pedestrian's leg (and against a FLEX PLI pedestrian-leg-impact-simulating test device), regardless of a particular location of impact. Their combination provides an unusual innovative combination capable of providing uniformity of impact resistance regardless of a point of impact and that is able to provide a novel system uniquely able to function in response to different types of impacts, especially as integrated with the tubular sensor 40 described below. Notably, the present disclosure is sufficient for an understanding by a person skilled in this art. However, the reader's attention is directed to Ralston U.S. Pat. No. 8,196,979 B2 (assignee Shape Corp), which describes a technology for providing uniformity of impact regardless of impact location. The disclosure of Ralston '979 is incorporated herein for its detailed discussion and teachings.

Briefly, the illustrated crush lobe dimensions (FIG. 3) are described as follows. Each crush lobe (31 and 32) has a vertical height dimension DV (measured on a front wall top to bottom), a horizontal width dimension DW (measured on a front wall side to side), and a depth dimension DD (measured from a front wall to a base flange). These dimensions are taken with the energy absorber in a vehicle-mounted position, and as if the crush lobe has very small radii at all corners. Nonetheless, it is noted that crush lobes may include considerable radii in some circumstances, and include significant draft angles of side walls, depending on molding and functional considerations. The crush lobes each include a centerline, and a centerline spacing dimension DS is a distance between centerlines in a same row, while centerline offset dimension DF is a horizontal distance between a centerline in one row (such as the top row) to a centerline in a different row (such as the bottom row).

Figure 3:
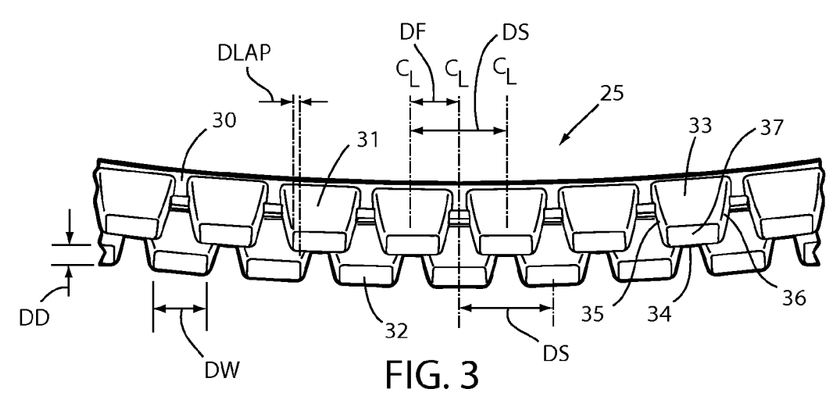
FIGS. 3 and 3A are fragmentary perspective and top views of the energy absorber in FIGS. 1-2.
Figure 3A:
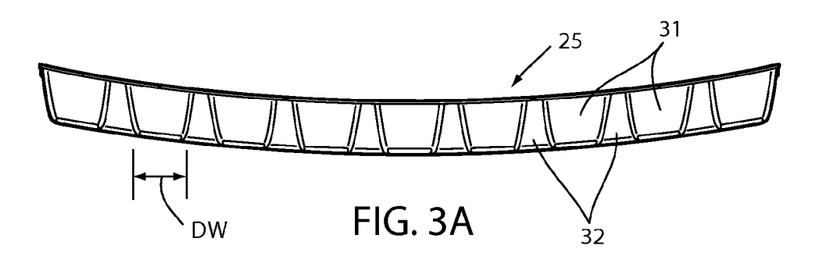
Figure 4:
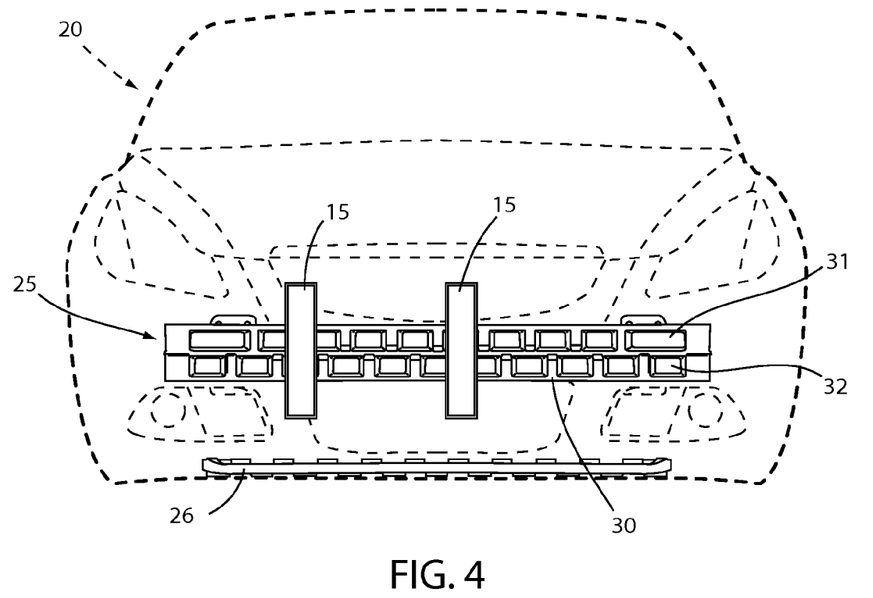
FIG. 4 is a front view of FIG. 1, and shows two FLEX PLI pedestrian-leg-injury-simulating testers, one being slightly to the right of a vehicle centerline, and one being significantly left of a vehicle centerline.

It is contemplated that dimensions of crush lobes may vary. An exemplary contemplated range for the various dimensions of crush lobes 31/32 in the energy absorber 25 is: DV=10 mm to 60 mm, DW=50 mm to 120 mm, DD=20 mm to 150 mm, DS=10 mm to 100 mm, and DF=10% to 90%. For example, the illustrated crush lobes are horizontally elongated to have a vertical height dimension DV and a horizontal width dimension DW, with a ratio of DV:DW less than 1.0, or more preferably a ratio of DV:DW of less than between 0.5 and 0.3. Restated, the illustrated crush lobes are 2-3 times longer in a horizontal direction than in a vertical direction. This dimensional ratio tends to provide good overlap of the crush lobes between top and bottom rows, and also good spacing of the vertical shear walls of the crush lobes. This in combination with crush lobe overall dimensions and spacing results in the shear walls being spread apart a distance, which results in more uniformity of force-deflection impact test results across the bumper system regardless of a particular point of impact against a pedestrian's leg or other object, as discussed below. This arrangement also provides a sufficiently short total vertical dimension that is able to meet the aesthetic and functional design constraints of most vehicle bumper systems, where a front fascia extends over and covers the bumper system vertically and horizontally.

Specifically, the illustrated top and bottom rows of crush lobes 31-32 (FIG. 3) form an alternating pattern across the vehicle. The illustrated top row 31 of crush lobes provides a high first force-deflection curve upon impact that is designed for barrier bumper impact testing by barrier tester 16, and the bottom row 32 of crush lobes provides a lower second force-deflection curve upon impact designed for FLEX PLI pedestrian-leg-injury-simulating impact testing by FLEX PLI impact tester 15 (also called "test device"). Each crush lobe has shear walls (see FIG. 7B), such as the illustrated four fore-aft-extending shear walls 33-36 that crush and crumple during frontal vehicle impact for optimal and predictable energy absorption, two of the shear walls 35, 36 being vertically oriented and horizontally spaced apart in adjacent crush lobes.

Figure 5:
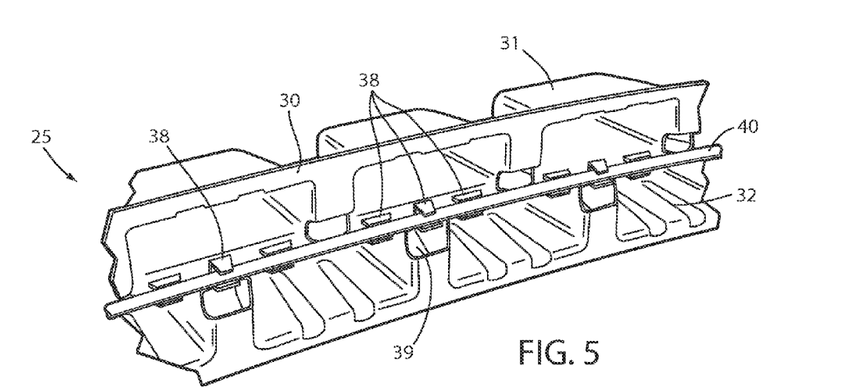
FIGS. 5-6 are rear perspective and rear views of the energy absorber with elongated tubular impact sensor (also called "sensor tube" herein), FIG. 5 showing prior to impact, FIG. 6 showing an impact slightly left of a centerline (keeping in mind that FIG. 6 is a rear view).

An elongated sensor 40 (see FIGS. 5-6, the illustrated sensor being a silicone sensor tube) is positioned partially under the inboard shear walls of the top and bottom crush lobes 31, 32 in a channel 39 defined under the base flange 30 and defined partially by the base of the bottom shear wall 34 in the top row crush lobes 31 and partially by the base of the top shear wall 33 in the bottom row crush lobes 32. It is also contemplated that the sensor 40 could alternatively be positioned on top of the base flange 30, with portions of the sensor 40 being partially under the shear walls 33-36 or at least immediately adjacent same the shear walls 33-36. By this arrangement, the shear walls 33-36 will be driven directly into or will collapse onto the sensor 40 during an impact.

As illustrated, the crush lobes are similarly-shaped and equally spaced-apart (except for some of the most outboard crush lobes, which are extended so that the outermost crush lobes 31 and 32 terminate in a same location at ends of the bumper beam 22, (see FIG. 1). The sensor 40 (FIG. 5) is secured by integrally-formed attachment tabs 38 in the channel 39 formed in the base flange 30 of the energy absorber 25, in a location sandwiched against the face of the reinforcement beam 22. This positively retains the sensor 40 in position on the bumper system 21, with few (or zero) separate fasteners, while facilitating quick assembly of the sensor tube to the energy absorber in a manner that, after assembly to the vehicle, provides reliable operation of the sensor tube 40.

Figure 11:
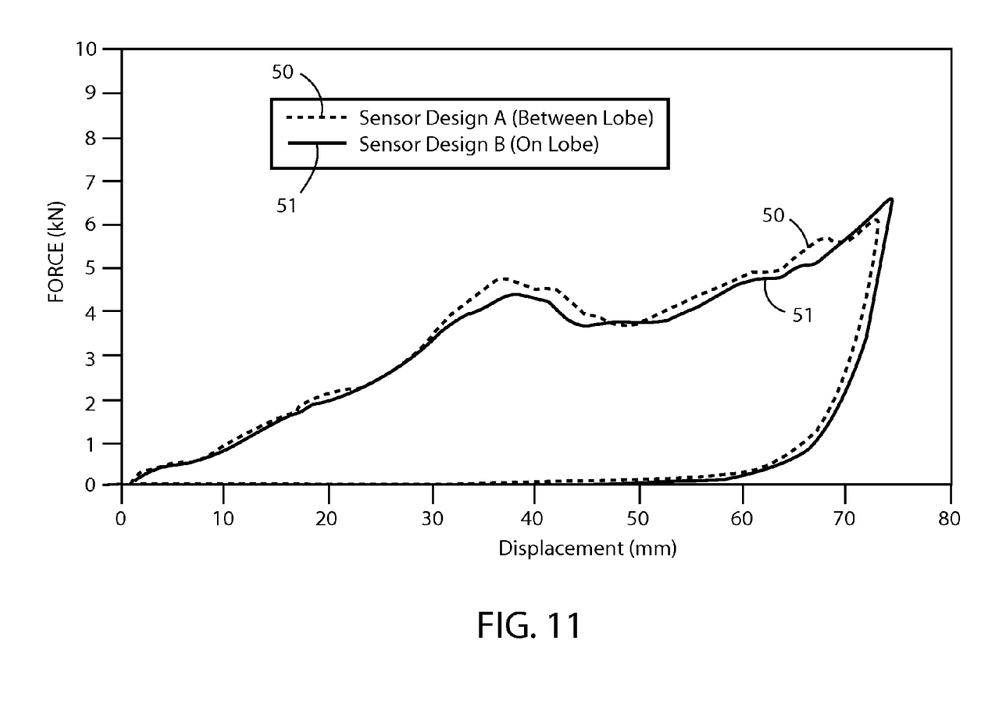
FIG. 11 is a graph showing on-lobe and off-lobe impact against a bumper system like FIG. 1 with the energy absorber of FIG. 3.
Figure 12:
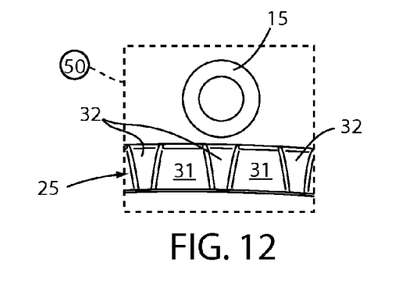
FIGS. 12 and 13 are top views of the on-lobe and off-lobe impacts in FIG. 11.
Figure 13:
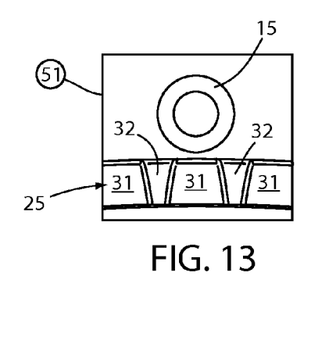

The present arrangement accurately and reliably causes the sensor tube 40 to generate a signal indicating a crash has occurred, including a severity of the crash. FIG. 11 is a graph showing on-lobe and off-lobe impact against a bumper system like FIG. 1, the bumper system including the energy absorber of FIG. 3. Lines 50 and 51 represent force-displacement curves when impacting a FLEX PLI pedestrian-leg-impact-simulating test device 15, line 50 being an impact between two adjacent top crush lobes 31 (see FIG. 12) and line 51 being an impact on-lobe with one of the top crush lobes 31 (see FIG. 13).

Figure 6:
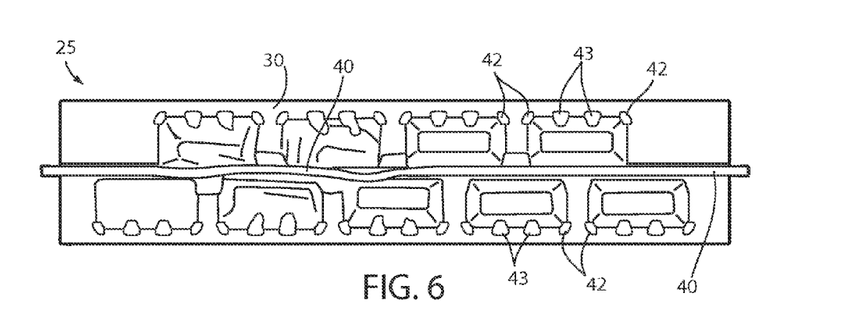

As noted, each crush lobe has a plurality of shear walls 33-36 that form a generally rectangular geometric shape with a face wall 37 that closes a forward end of each crush lobe. The shear walls 33-36 are curved slightly to facilitate predictable crumbling and good energy absorption (and to resist premature catastrophic failure during an impact), and also to facilitate molding. The shear walls 33-36 can be tuned to provide a two-stage level of impact resistance, with the first stage (illustrated by zone Z1, FIG. 7B) being a softer (lower) force of resistance, and the second stage (illustrated by zone Z2, FIG. 7B) being a stiffer (higher) force of resistance. The first stage can be tuned into the crush lobes 31,32 by forming apertures 42 in areas where crush lobes inherently provide a higher force of resistance. For example, FIG. 6 illustrates that weakening apertures 42 can be formed into the corners defined by the base flange 30 and corners of the crush lobes, such as at locations defined by components 30/33/34 (or 30/34/35, or 30/35/36, or 30/36/33). Also weakening apertures 43 can be formed into the base flange 30 near a middle/bottom of the shear walls 33-36. A size of the apertures 42-43 causes most of a collapse of the shear walls 33-36 to occur in zone Z1 (FIG. 7B) during the first stage of impact, and cause most of a remaining collapse of the shear walls 33-36 to occur in zone Z2 during the second stage of impact. Notably, the apertures 42 and 43 can be formed into injection molding tooling, and can be modified within the molding tooling, such that tuning of the crush lobes can be readily and relatively easily accomplished, even late in a bumper development program. This is seen as a very significant advantage.

Figures 7A, 7B:
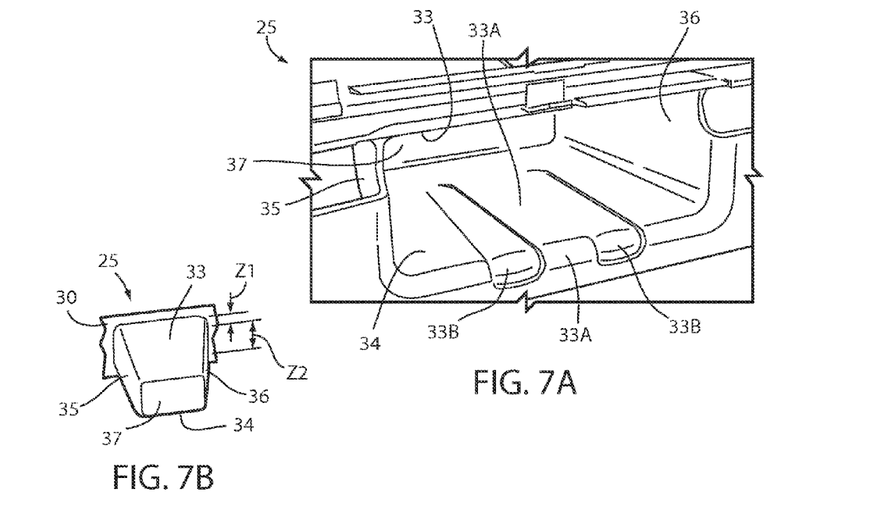
FIGS. 7A-7B are rear and front perspective views of a crush lobe in a modified energy absorber, where a shear wall of the crush lobe includes a stiff wall structure (with thicker wall section) and also a soft wall structure (with thinned wall section).
Figure 8:
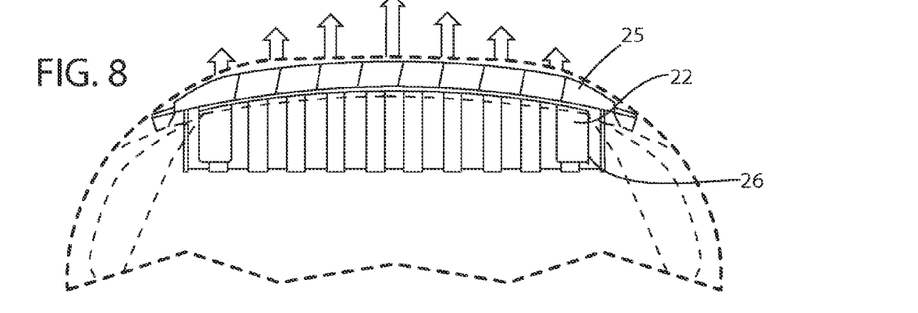
FIGS. 8-9 are top and side views of a vehicle front end including the present bumper system and apron, the different-length arrows in FIG. 8 showing varied resistance to a frontal impact across a front of the bumper system, the longer arrow in FIG. 9 showing a high impact resistance to a barrier test (see FIG. 10) and the shorter arrow showing a lower (softer) impact resistance to a pedestrian (or FLEX PLI pedestrian-leg-simulating impact tester).

In the second zone Z2, the shear walls 33-36 and front wall 37 form a box-like shape which provides excellent energy-absorbing characteristics (i.e. good force-deflection), including a quick rise in force of resistance during an initial impact stroke, and then a high level of continued resistance including substantial energy-absorbing dense-folding of shear walls during a further impact stroke. This is sometimes referred to as an efficient energy absorber in the industry, and is a desirable condition in vehicle bumper systems. In the first zone Z1, the shear walls 33-36 and base flange 30 are weakened by the apertures 42,43, such that a plurality of almost strap-like structures support the box-like shapes described above. The strap-like structures quickly collapse in zone Z1, leading to the softer impact resistance, described above, yet they operably support the box-like shapes in a manner maintaining the desirable energy-absorbing characteristics of the overall energy absorber system when an impact stroke fully collapsed zone Z1 and causes crushing of zone Z2.

The illustrated shear walls 33-36 (FIG. 7A) include a different, but also effective way of producing a two-stage impact (i.e. soft initial impact resistance, and delayed higher impact resistance). Specifically, the shear walls 33-36 (FIG. 7A) all include stiff wall structure 33A of a first wall thickness, such as 2-5 mm thickness, and at least some shear walls also including a soft wall structure 33B formed by thinned material thickness that is thinner than the first wall thickness, such as 0.8-2.0 mm thickness. The thinned soft wall structure 33A is strategically located along the shear walls 33-36, such as near corners and typically near the base flange 30, as shown in FIG. 7A. Also, a shape of the very thin wall structure 33B begins in the base flange 30 of the energy absorber 25, and extends along the shear walls 33-36 tapering to a smaller width as the "finger" of the very thin wall section extends toward a front of the associated shear wall.

Notably, the thick and thin wall structure 33A and 33B can be formed into injection molding tooling, and can be modified within the molding tooling, such that tuning of the crush lobes can be readily and relatively easily accomplished, even late in a bumper development program. This is seen as a very significant advantage. Also, the material can be changed late in a bumper development program to improved bumper test results. It is contemplated that the illustrated energy absorber can be made of polymeric materials such as PP, TPO, PC/PBT, that a wall thickness is typically 1 mm-4 mm, and that a preferred manufacturing process for forming the energy absorbers includes injection molding or thermoforming. Lobe dimensions can be varied significantly depending on the (higher) impact requirements of the upper row of crush lobes and the (lower/softer) impact requirements of the lower row of crush lobes. Particular preferred dimensions for the illustrated crush lobes 31, 32 were discussed above.

The sensor tube 40 (FIG. 6) is attached to the energy absorber 25 in a position where energy from a low impact occurrence is absorbed by the soft wall structure 33B, such that the sensor 40 does not send a false signal indicating a substantial/high impact. However, a higher impact energy from a high impact occurrence causes the stiff wall structure 33A to move into and engage the sensor tube 40 and send a reliable signal (i.e. a surge of compressed air) representing a high impact occurrence. Due to a location of the sensor tube 40, the shear walls 33-36 are driven into the sensor tube 40, which results in a sensing system that is able to discriminate between a low impact and high impact, and also which results in a sensing system that is sensitive and generally able to generate an accurate discriminating impact-sensing signal.

Figure 9:
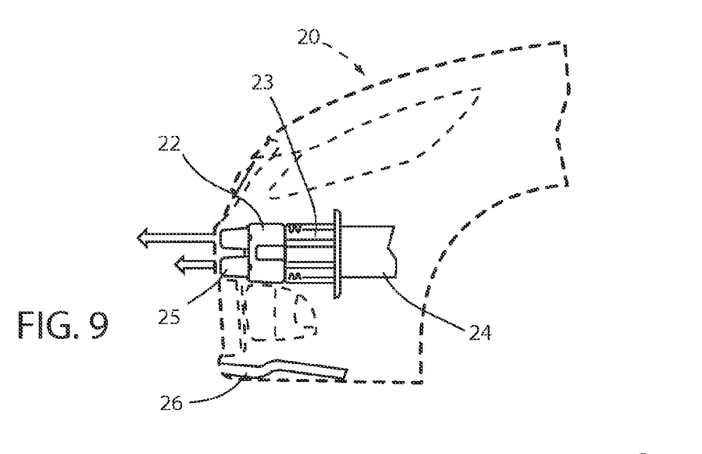
Figure 10:
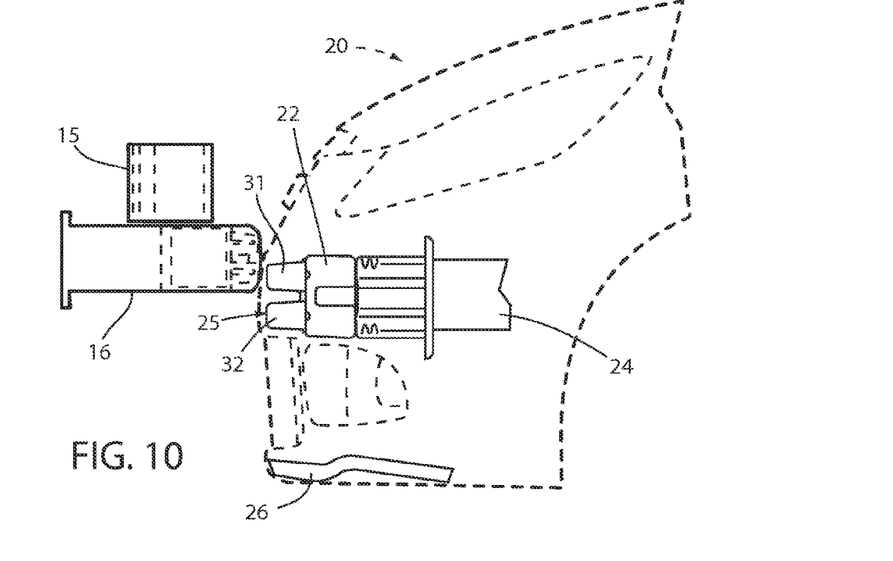
FIG. 10 is an enlarged side view similar to FIG. 9 but showing a barrier bumper impactor.

The bumper system 21 described above combines with an apron 26 on the vehicle 20 for optimal pedestrian impact characteristics that minimize pedestrian leg injury (based on testing using the FLEX PLI leg-injury-simulating tester 15). Specifically, the apron 26 is attached to the vehicle frame and extends generally horizontally at a location spaced below the beam 22, such as at a height of a typical pedestrian's ankle. The beam 22 and top row 31 of crush lobes combine to define a high first force-deflection curve and relatively flat front that, upon impact by a barrier bumper impact tester 16 (see FIGS. 9-10), provides high energy absorption to pass barrier bumper impact testing (such as is required by the FMVSS government and IIHS insurance institute, which set bumper test standards). The bottom row of crush lobes 32 and apron 26 combine to define a lower second force-deflection curve.

An optimal system of crush lobes 32 and apron 26 defines a relatively flat front vehicle surface (referred to as "flatness" herein) so that, upon impact against a FLEX PLI pedestrian-leg-injury-simulating impact testing device 15, it provides a lower second force-deflection curve upon that provides reduced leg injury sufficient to pass FLEX PLI leg-injury-simulating impact testing. The term "flat front vehicle surface" is used herein to mean that a vertical cross section of the front surface defines a line that is relatively vertical and flat, even though a front on the vehicle is laterally curved/swept rearwardly near its fenders. Surprisingly, the flatness of the front vehicle surface, as defined by the lower crush lobes 32 and apron 26, works in part because the flatness tends to reduce a tendency of a struck pedestrian to fall under the vehicle as the vehicle continues to move forward after impact against the pedestrian. Also, a strength and relative position of the crush lobes 32 and apron 26 cause a good distribution of stress into the pedestrian's leg, regardless of where the impact occurs on the crush lobes 32 and apron 26.

The present innovation allows for consistent local loading laterally across vehicle during pedestrian impact (i.e. "on lobe" and "between lobe" impacts results in similar force-deflection curves). It also provides alternative load level for IIHS bumper barrier offset overlap impacts (i.e. one lower row of lobes is designed for pedestrian impact loading, and a second higher row of lobes are designed to provide a different/higher load for bumper barrier loading). It also allows consistent deformation of lobes at all locations, during pedestrian impacts, and therefore allows for integration of the silicone sensor tube.

The present design solves previous issues seen in other designs. For example, the present design maintains package space (lobe depth) and load performance is maintained. In other words, the present design does not require "extra" package space to meet impact force-deflection curve requirements, and yet high quality load performance is maintained. Also, the present innovation includes shear walls having stiff and "soft" wall structures (that provide optimal low-initial force of resistance to impact, while providing higher resistance to impact forces upon continued impact stroke), which structures are designed to provide benefits in injection molding tooling, such as reduced sensitivity of the molded part to core die shifting (which results in inconsistent wall thickness depth in molded parts). This improved molding and crush lobe tuning is achieved by "closing" crush initiation holes (i.e. the molded energy absorber does not have to include said crush initiation holes), since they are replaced by very thin wall sections (i.e. the soft wall structure 33B).

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper system comprising:
   a bumper reinforcement beam having a face surface; and
   an energy absorber having a base flange engaging the face surface, and having forwardly-extending top and bottom rows of spaced-apart crush lobes, the top row of crush lobes providing a higher first force-deflection curve upon impact that is designed for barrier bumper impact testing, and the bottom row of crush lobes providing a lower second force-deflection curve upon impact designed for minimizing injury to a pedestrian based on FLEX PLI pedestrian-leg-injury-simulating impact testing.

2. The bumper system defined in claim 1, wherein centerlines of the crush lobes in the top row pass vertically between the crush lobes in the bottom row.

3. An energy absorber apparatus adapted for a bumper system having a bumper reinforcement beam, the apparatus comprising:
   an energy absorber including a base flange adapted to engage the reinforcement beam and having forwardly-extending top and bottom rows of crush lobes, each crush lobe having shear walls; and
   an elongated sensor positioned at least partially between several of the crush lobes in a position where an impact will drive some of the shear walls into the sensor.

4. A bumper system comprising:
   a bumper reinforcement beam having a face surface; and
   an energy absorber having a base flange engaging the face surface, and having forwardly-extending top and bottom rows of crush lobes with the crush lobes being in non-vertically aligned positions, each crush lobe having shear walls; and
   an elongated sensor positioned partially under the energy absorber against the face surface.

5. The bumper system defined in claim 4, wherein the base flange defines a horizontal channel receiving the sensor.

6. A bumper system comprising:
   a bumper reinforcement beam having a face surface;
   an energy absorber having a base flange engaging the face surface, and having at least one forwardly-extending row of similarly-shaped spaced-apart crush lobes; and
   a horizontally-extending sensor secured to the energy absorber to retain the sensor in position on the bumper system in a position where an impact will drive some of the shear walls into the sensor.

7. The bumper system defined in claim 6, wherein the energy absorber includes integrally-formed structure attaching the sensor to the energy absorber.

8. The bumper system defined in claim 7, wherein the sensor comprises a tubular sensor.

9. The bumper system defined in claim 8, wherein the integrally-formed structure includes attachment tabs on the energy absorber.

10. A bumper system comprising:
a bumper reinforcement beam having a face surface; and
an energy absorber having a base flange engaging the face surface, and having at least one forwardly-extending row of similarly-shaped spaced-apart crush lobes, each crush lobe having a plurality of shear walls that form a geometric shape with a face wall that closes a forward end of each crush lobe, the shear walls all including stiff wall structure of first wall thickness and at least some shear walls also including a soft wall structure formed by thinned material thickness that is thinner than the first wall thickness and that causes a lower force of resistance during an initial impact stroke; and
a sensor located on the energy absorber in a position where an impact will drive some of the shear walls toward the sensor.

11. The bumper system of claim 10, wherein the sensor includes a sensor tube attached longitudinally to the energy absorber in a position where energy from a low impact occurrence is absorbed by the soft wall structure and energy from a high impact occurrence causes the stiff wall structure to engage the sensor tube and send a signal representing a high impact occurrence.

12. A bumper system comprising:
a bumper reinforcement beam having a face surface; and
an energy absorber having a base flange engaging the face surface, and having forwardly-extending top and bottom rows of similarly-shaped spaced-apart crush lobes; and
an apron extending horizontally and spaced below the beam;
the beam and top row of crush lobes combining to define a high first force-deflection curve that upon impact by a barrier bumper impact tester provides energy absorption to pass barrier bumper impact testing;
the bottom row of crush lobes and apron combining to define a lower second force-deflection curve that upon impact against a FLEX PLI pedestrian-leg-injury-simulating impact testing device provides a lower second force-deflection curve that provides reduced leg injury sufficient to pass FLEX PLI leg-injury-simulating impact testing.

13. A bumper system comprising:
a bumper reinforcement beam having a face surface; and
an energy absorber having a base flange engaging the face surface and further having forwardly-extending top and bottom rows of similarly-shaped spaced-apart crush lobes, each crush lobe having a centerline offset from the centerlines of vertically adjacent crush lobes, and each crush lobe having a vertical dimension DV and a horizontal dimension DW, with a ratio of DV:DW being less than 1.0.

14. The bumper system of claim 13, wherein the ratio DV:DW is less than 0.5, such that when the energy absorber is in a vehicle mounted position, the crush lobe extends horizontally at least about twice a vertical dimension DV.

* * * * *